US011548563B2

(12) United States Patent
Oliveira

(10) Patent No.: US 11,548,563 B2
(45) Date of Patent: Jan. 10, 2023

(54) WHEELHOUSE DEFLECTOR

(71) Applicant: GM GLOBAL TECHNOLOGY OPERATIONS LLC, Detroit, MI (US)

(72) Inventor: Danilo A. Oliveira, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 105 days.

(21) Appl. No.: 17/167,597

(22) Filed: Feb. 4, 2021

(65) Prior Publication Data

US 2022/0242489 A1 Aug. 4, 2022

(51) Int. Cl.
*B62D 25/18* (2006.01)
*B62D 25/16* (2006.01)

(52) U.S. Cl.
CPC ........... *B62D 25/18* (2013.01); *B62D 25/163* (2013.01)

(58) Field of Classification Search
CPC ...... B62D 25/18; B62D 25/163; B62D 25/16; B62D 25/161
See application file for complete search history.

(56) References Cited

U.S. PATENT DOCUMENTS

| | | | | |
|---|---|---|---|---|
| 8,556,297 B2* | 10/2013 | Uehara | ................ | B62D 25/161 280/851 |
| 10,857,952 B2* | 12/2020 | Nakayama | ............ | B60R 19/483 |
| 10,882,564 B2* | 1/2021 | Dennis | ................ | B62D 25/163 |
| 10,981,605 B2* | 4/2021 | Kishima | ................ | B62D 25/18 |
| 11,220,222 B2* | 1/2022 | Kitagawa | .............. | B60R 19/483 |
| 11,286,006 B2* | 3/2022 | Nishino | ................ | B62D 25/18 |
| 11,305,712 B2* | 4/2022 | Kataoka | ................ | B60R 19/483 |
| D954,620 S * | 6/2022 | Ahn | ............................ | D12/173 |
| 2011/0115253 A1* | 5/2011 | Kishi | ................... | B62D 25/161 296/151 |
| 2019/0168684 A1* | 6/2019 | Higashimachi | ........ | H04N 5/247 |
| 2021/0001794 A1* | 1/2021 | Umeki | .................... | B60R 11/00 |
| 2021/0148737 A1* | 5/2021 | Yamaji | .................. | G01S 13/931 |
| 2021/0229754 A1* | 7/2021 | Shibata | ................. | B62D 25/18 |

FOREIGN PATENT DOCUMENTS

| | | | | |
|---|---|---|---|---|
| DE | 102012023410 A1 * | 5/2013 | ........ | B60R 13/0861 |
| DE | 102017205872 A1 * | 10/2017 | ............ | B60K 11/08 |
| DE | 102017004708 A1 * | 11/2018 | | |
| DE | 102017004708 A1 | 11/2018 | | |
| DE | 102017009054 A1 * | 3/2019 | | |
| DE | 102018222696 A1 * | 7/2019 | ............ | B62D 25/18 |
| EP | 1300324 A2 * | 4/2003 | .......... | B62D 25/161 |
| JP | 2019034639 A * | 3/2019 | ............... | B60S 1/54 |

* cited by examiner

*Primary Examiner* — Steve Clemmons
(74) *Attorney, Agent, or Firm* — Quinn IP Law

(57) ABSTRACT

A wheelhouse liner for a vehicle includes a body portion and a wheelhouse deflector positioned inside the wheelhouse. The deflector includes a deflector portion extending from a first edge of the wheelhouse liner to form a lip at an outboard edge of the wheelhouse liner. In some examples, the wheelhouse deflector includes a deflector surface defining a depression configured to direct a flow of fluid away from a vehicle sensor.

20 Claims, 2 Drawing Sheets

WHEELHOUSE DEFLECTOR

INTRODUCTION

The present disclosure relates generally to a wheelhouse deflector to protect sensors located near the wheel molding or wheel flare of a vehicle from liquid and debris.

As an automotive vehicle travels, liquid and debris can be thrown from the tires into the wheelhouse. As vehicles become more automated, sensors and cameras are positioned in various areas of the vehicle, including the wheelhouse. These sensors and cameras are thus subject to exposure to dirt and debris and need to be cleaned for ideal performance.

SUMMARY

Embodiments according to the present disclosure provide a number of advantages. For example, embodiments according to the present disclosure enable deflection of liquid and debris from the cameras and/or sensors positioned near the front fender or near the wheelhouse of a vehicle.

In one aspect of the present disclosure, an automotive vehicle includes a body including a wheelhouse. The has a wheelhouse liner. The automotive vehicle also includes a wheel coupled to the body and encircled by the wheelhouse, a vehicle sensor positioned adjacent to the wheelhouse, and a wheelhouse deflector positioned inside the wheelhouse. The wheelhouse deflector includes a deflector portion extending from a first edge of the wheelhouse liner to form a lip at an outboard edge of the wheelhouse liner.

In some aspects, the vehicle sensor is positioned forward of the wheelhouse and the wheelhouse deflector is configured to direct a flow of fluid away from the vehicle sensor.

In some aspects, the wheelhouse deflector is formed integrally with the wheelhouse liner.

In some aspects, the wheelhouse deflector extends along the outboard edge of the wheelhouse liner from a first position forward of the wheel to a second position.

In some aspects, the second position is aft of the wheel.

In another aspect of the present disclosure, an automotive vehicle includes a body including a wheelhouse. The has a wheelhouse liner. The automotive vehicle also includes a wheel coupled to the body and encircled by the wheelhouse, a vehicle sensor positioned adjacent to the wheelhouse, and a wheelhouse deflector positioned inside the wheelhouse. The wheelhouse deflector includes a deflector surface defining a depression configured to direct a flow of fluid away from the vehicle sensor.

In some aspects, the depression is adjacent to an outboard edge of the wheelhouse liner.

In some aspects, wherein the depression is positioned interior of the outboard edge of the wheelhouse liner.

In some aspects, the depression extends generally parallel to the outboard edge of the wheelhouse liner.

In some aspects, the vehicle sensor is positioned forward of the wheelhouse.

In some aspects, the wheelhouse deflector is formed integrally with the wheelhouse liner.

In some aspects, the wheelhouse deflector extends along the outboard edge of the wheelhouse liner from a first position forward of the wheel to a second position.

In some aspects, the second position is aft of the wheel.

In another aspect of the present disclosure, a wheelhouse liner for a vehicle includes a body portion and a wheelhouse deflector positioned inside the wheelhouse. The deflector includes a deflector portion extending from a first edge of the wheelhouse liner to form a lip at an outboard edge of the wheelhouse liner.

In some aspects, the wheelhouse deflector includes a deflector surface defining a depression configured to direct a flow of fluid.

In some aspects, the depression is positioned interior of the outboard edge of the wheelhouse liner.

In some aspects, the depression extends generally parallel to the outboard edge of the wheelhouse liner.

In some aspects, the depression is adjacent to an outboard edge of the wheelhouse liner.

In some aspects, the wheelhouse deflector is formed integrally with the wheelhouse liner.

In some aspects, the wheelhouse deflector extends along the outboard edge of the wheelhouse liner from a first position to a second position aft of the first position.

BRIEF DESCRIPTION OF THE DRAWINGS

The present disclosure will be described in conjunction with the following figures, wherein like numerals denote like elements.

Figure 2:
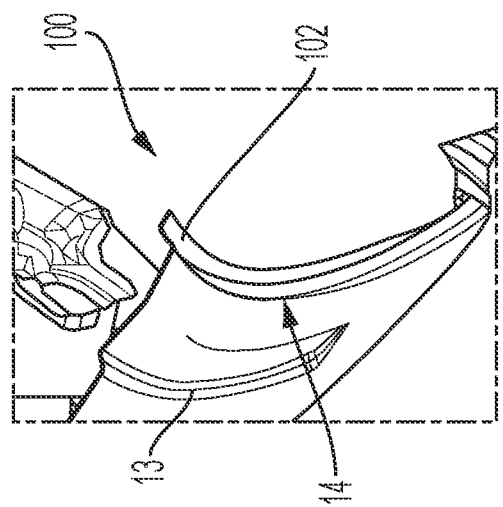
FIG. 2 is a close-up perspective view of the wheelhouse soiling deflector of FIG. 1, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "Left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

The operation of modern vehicle is becoming more automated, i.e., able to provide driving control with less driver interaction. To enable vehicle driving control, the vehicle includes a plurality of sensors positioned around the vehicle and configured to provide data regarding the vehicle's environment. In various embodiments, the vehicle includes one or more sensors positioned near the wheel flare or wheel molding near the wheelhouse of the vehicle. In this position near the wheelhouse, the sensors are exposed to contaminants such as road splash and debris that can interfere with sensor operation. In various embodiments, washer systems are used to keep the sensors clean of debris or other contaminants; however, the washer systems increase the complexity of the sensor installation.

Figure 1:
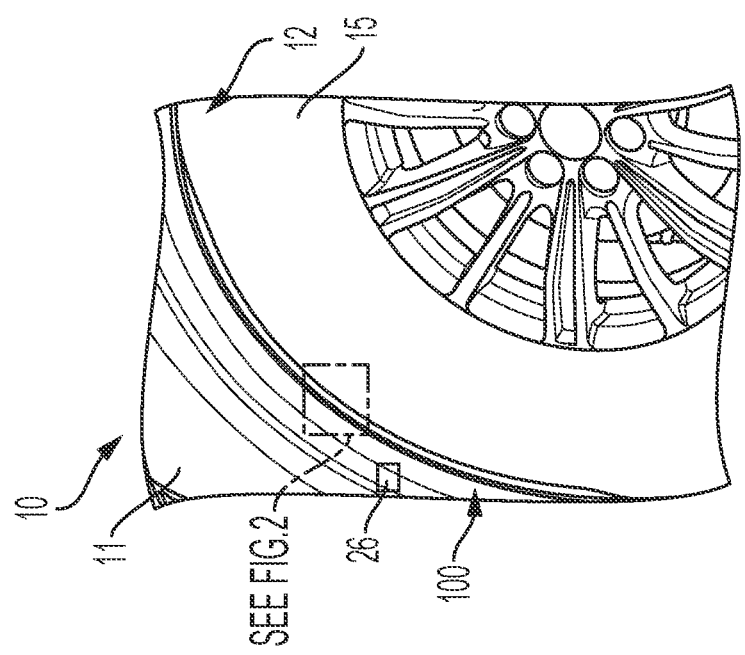
FIG. 1 is a schematic illustration of a vehicle wheelhouse having a wheelhouse soiling deflector, according to an embodiment.

FIGS. 1 and 2 illustrate one embodiment of a wheelhouse deflector for a vehicle. As described herein, in various embodiments, a vehicle 10, shown in a partial view in FIG. 1, includes a body 11 and a wheelhouse 12. The 12 encircles a wheel 15 that is coupled to the body 11. The 12 includes a wheelhouse liner 13 that is coupled to or formed integrally with the wheelhouse 12. The liner 13 is a body portion that includes a wheelhouse deflector 100. With reference to FIGS. 1 and 2, the wheelhouse deflector 100 is positioned inside the wheelhouse liner 13 or integrated with the wheelhouse liner 13 to shield a sensor 26 from contaminants thrown up by the wheel 15 or from road splash/etc.

In various embodiments, as shown in FIG. 2, the wheelhouse deflector 100 includes a deflector portion 102 extending from a first or outboard edge 14 of the wheelhouse liner 13. The first or outboard edge 14 is located at an outboard position of the wheelhouse liner 13. The deflector portion 102 extends from the outboard edge 14 downward, that is, toward the area defined by the wheelhouse 12, forming a lip or edge at the outboard edge of the wheelhouse liner 13. The deflector 100 is positioned with the wheelhouse liner 13 such that a sensor, such as the sensor 26 shown in FIG. 1, is protected from a spray of contaminants from the wheel 15.

In various embodiments, the sensor 26 is positioned forward of the wheelhouse 12 and the wheelhouse deflector 100 is configured to direct a flow of fluid away from the sensor 26. In various embodiments, the wheelhouse deflector 100 extends along the first or outboard edge 14 of the wheelhouse liner 13 from a first position forward of the wheel 15 to a second position, as shown in FIG. 1. In various embodiments, the second position is aft of the first position, and, in some embodiments, is aft of the wheel 15.

Figure 4:
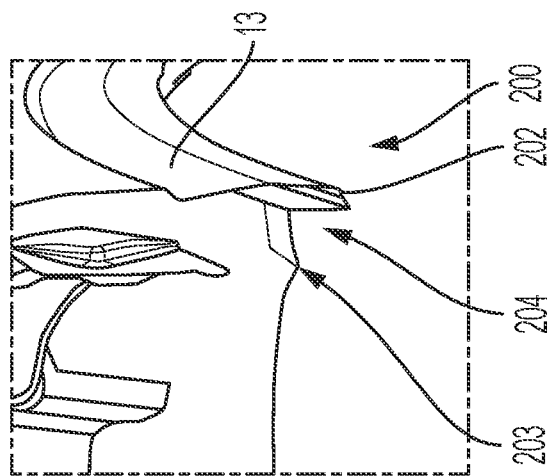
FIG. 4 is a close-up perspective cross-sectional view of the wheelhouse soiling deflector of FIG. 3, according to an embodiment.
Figure 3:
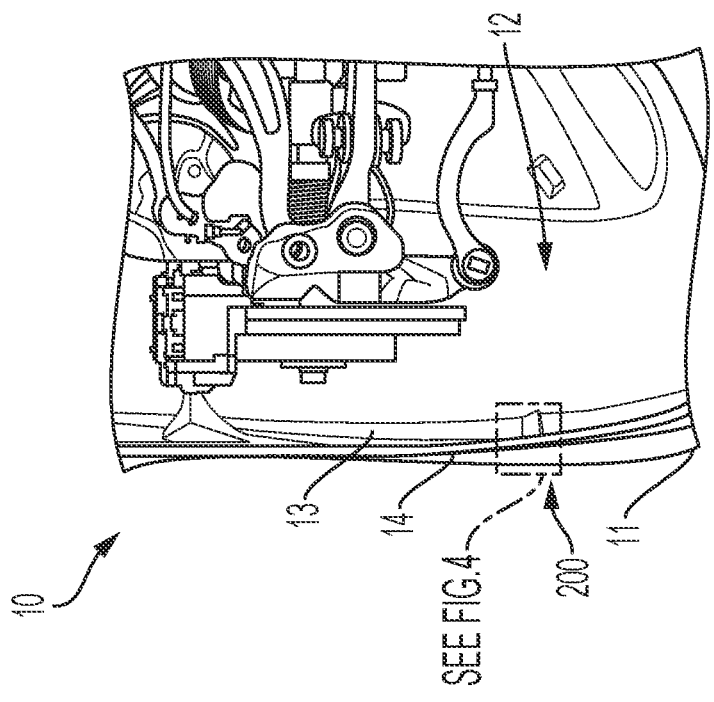
FIG. 3 is a schematic underside view of a vehicle wheelhouse having a wheelhouse soiling deflector, according to another embodiment.

Another embodiment of a wheelhouse deflector 200 is shown in FIGS. 3 and 4. Similar to the embodiment shown in FIGS. 1 and 2, the vehicle 10 includes a body 11 and a wheelhouse 12 having a wheelhouse liner 13. The liner 13 includes the wheelhouse deflector 200 positioned near the first or outboard edge 14 of the wheelhouse liner 13. In various embodiments, the wheelhouse deflector 200 is manufactured as part of and is unitary with the wheelhouse liner 13.

With reference to FIG. 4, the wheelhouse deflector 200 includes an edge 202. In various embodiments, the edge 202 is an outboard edge of the wheelhouse liner 13. A deflector surface 203 defines a ditch or depression 204. The depression 204 is positioned interior of the outboard edge 14 of the wheelhouse liner 13 in order to hide the depression 204 from view from outside of the vehicle 10. In various embodiments, the depression 204 extends generally parallel to the outboard edge 14 of the wheelhouse liner 13. A spray of contaminants from the wheel 15 is directed along the deflector surface 203 and is retained within the depression 204 such that the spray is prevented from going past the edge 202. The depression 204 is positioned inward of the outboard edge 14 of the wheelhouse liner 13 to direct a flow of fluid away from a sensor positioned adjacent to the wheelhouse, such as the sensor 26 shown in FIG.1.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes, and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle, comprising:
   a body with a shape that defines a wheelhouse, wherein the wheelhouse has a rim;
   a wheel coupled to the body and partially encircled by the wheelhouse;
   a vehicle sensor positioned on the body adjacent to the wheelhouse;
   a liner positioned inside the wheelhouse and coupled to the wheelhouse, wherein the liner has an outboard edge that curves from being flush with the rim of the wheelhouse at a top position over the wheel to being separated from the rim of the wheelhouse at a first position forward of the wheel; and
   a deflector portion coupled to the liner along the outboard edge of the liner, wherein the deflector portion extends away from the liner towards the wheel.

2. The automotive vehicle of claim 1, wherein:
   the vehicle sensor is positioned forward of the wheelhouse; and
   the deflector portion is configured to direct a flow of fluid sprayed against the liner by the wheel away from the vehicle sensor.

3. The automotive vehicle of claim 1, wherein the deflector portion is formed integrally with the liner.

4. The automotive vehicle of claim 1, wherein the deflector portion extends along the liner from the first position forward of the wheel to a second position aft of the wheel.

5. An automotive vehicle, comprising:
   a body with a shape that defines a wheelhouse, wherein the wheelhouse has a rim;
   a wheel disposed within the wheelhouse;
   a vehicle sensor positioned on the body adjacent to the wheelhouse;
   a liner positioned inside the wheelhouse and coupled to the wheelhouse, wherein:
      the liner has an outboard edge that curves from being flush with the rim of the wheelhouse at a top position over the wheel to being separated from the rim of the wheelhouse at a first position forward of the wheel; and
      the liner defines a depression; and
   a deflector portion coupled to the liner adjacent to the depression of the liner, wherein:
      the deflector portion extends away from liner toward the wheel; and
      a combination of the deflector portion and the depression direct a flow of fluid sprayed against the liner by the wheel away from the vehicle sensor.

6. The automotive vehicle of claim 5, wherein the depression is adjacent to the deflector portion and on an opposite side of the deflector portion as the outboard edge of the liner.

7. The automotive vehicle of claim 6, wherein the depression extends generally parallel to the deflector portion.

8. The automotive vehicle of claim 6, wherein the deflector portion extends along the liner from the first position forward of the wheel to a second position aft of the wheel.

9. The automotive vehicle of claim 5, wherein the vehicle sensor is positioned forward of the wheelhouse.

10. The automotive vehicle of claim 5, wherein the deflector portion is formed integrally with the liner.

11. The automotive vehicle of claim 5, wherein:
    the liner has a surface that follows the wheelhouse; and
    the surface protrudes toward the wheel adjoining the depression.

12. The automotive vehicle of claim 11, wherein:
    the surface of the liner defines a ridge; and
    the ridge inhibits the flow of fluid sprayed against the liner by the wheel from flowing outward toward the deflector portion.

13. The automotive vehicle of claim 12, wherein a height of the ridge is tapered to be flush with the surface of the liner proximate the first position forward of the wheel.

14. A liner for a wheelhouse that partially encircles a wheel of a vehicle, the liner comprising:
    a body portion couplable to the wheelhouse, wherein the body portion has an outboard edge that curves from being flush with a rim of the wheelhouse at a top position over the wheel to being separated from the rim of the wheelhouse at a first position forward of the wheel; and
    a deflector portion coupled to the body portion at the outboard edge of the body portion, wherein the deflector portion extends away from body portion toward the wheel.

15. The liner of claim 14, wherein the body portion defines a depression configured to direct a flow of fluid sprayed against the liner by the wheel away from a particular location outside the wheelhouse.

16. The liner of claim 15, wherein the depression is positioned interior of the outboard edge of the body portion.

17. The liner of claim 16, wherein the depression extends generally parallel to the deflector portion and on an opposite side of the deflector portion as the outboard edge of the liner.

18. The liner of claim 15, wherein the depression is adjacent to the deflector portion.

19. The liner of claim 14, wherein the deflector portion is formed integrally with the body portion.

20. The liner of claim 14, wherein the deflector portion extends along the outboard edge of the body portion from the first position forward of the wheel to a second position aft of the wheel.

* * * * *